(12) United States Patent
Penton et al.

(10) Patent No.: US 7,489,752 B2
(45) Date of Patent: Feb. 10, 2009

(54) SYNCHRONISATION OF SIGNALS BETWEEN ASYNCHRONOUS LOGIC

(75) Inventors: Antony John Penton, Longstanton (GB); Vladimir Vasekin, Cambridge (GB); Andrew Christopher Rose, Cambridge (GB); Paul Stanley Hughes, Cambridge (GB); Christopher Edwin Wrigley, Saffron Walden (GB)

(73) Assignee: ARM Limited, Cambridge (GB)

( * ) Notice: Subject to any disclaimer, the term of this patent is extended or adjusted under 35 U.S.C. 154(b) by 594 days.

(21) Appl. No.: 11/314,737

(22) Filed: Dec. 22, 2005

(65) Prior Publication Data

US 2007/0150771 A1 Jun. 28, 2007

(51) Int. Cl.
*H04L 7/00* (2006.01)
(52) U.S. Cl. ......................... 375/356; 375/371
(58) Field of Classification Search ................ 375/354, 375/355, 356, 371, 373
See application file for complete search history.

(56) References Cited

U.S. PATENT DOCUMENTS 6,424,179 B1 * 7/2002 Stevens ........................ 326/93

2007/0113230 A1 * 5/2007 Bourdon et al. ............. 718/100

* cited by examiner

*Primary Examiner*—David B Lugo
(74) *Attorney, Agent, or Firm*—Nixon & Vanderhye P.C.

(57) ABSTRACT

A data processing apparatus comprising a plurality of data processors, each data processor comprising: first logic operable in a first clock domain and further logic operable in a second clock domain, said first and second clock domains being asynchronous with each other; a synchronizer operable to synchronize a signal processed by said first logic to produce a signal synchronized to said second clock domain; a synchronized signal output operable to export from said data processor said synchronized signal output from said synchronizer; and a signal input operable to import a signal to said data processor, said data processor being operable to route said imported signal to said further logic; wherein said plurality of data processors are arranged to operate in parallel with each other and said data processing apparatus further comprises: combining logic arranged to receive said exported synchronized signals from each of said plurality of data processors and to combine said exported synchronized signals to produce a resultant signal, said resultant signal being routed to each of said signal inputs of said plurality of data processors.

11 Claims, 8 Drawing Sheets

SYNCHRONISATION OF SIGNALS BETWEEN ASYNCHRONOUS LOGIC

BACKGROUND OF THE INVENTION

1. Field of the Invention

This invention relates to the field of data processing systems. More particularly, this invention relates to the field of synchronising signals within processors having asynchronous logic.

2. Description of the Prior Art

In some circumstances it may be desirable to use more than one clock within a data processor. However, this can produce its own problems of synchronisation of signals passing between the different clock domains. One example of this is in a system which can respond to a WFI or wait for interrupt signal. Such a signal is used to power down at least a portion of a processor during an inactive period and thereby reduce power consumption, the processor being restarted in response to receipt of an interrupt signal.

Figure 1:
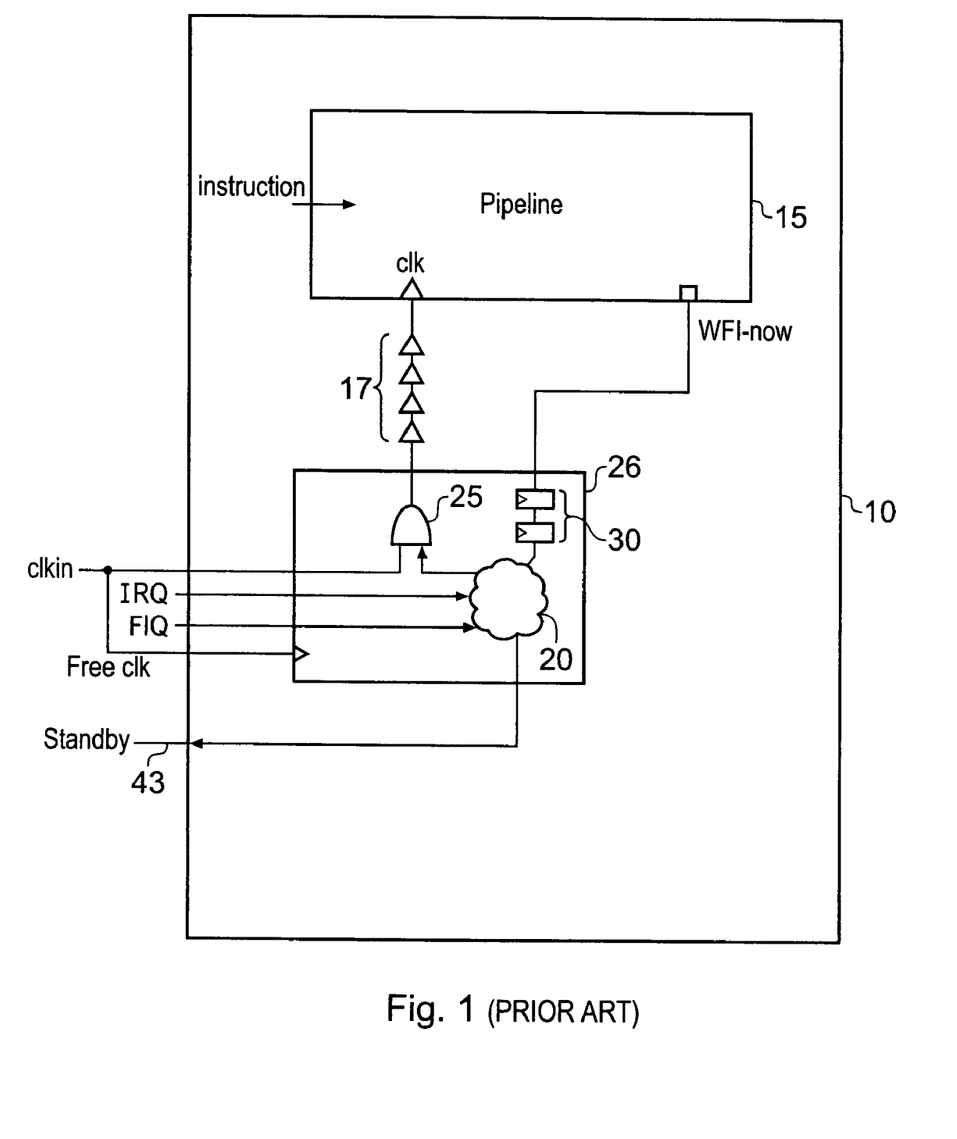
FIG. 1 schematically illustrates a processor processing a "wait for interrupt instruction" according to the prior art.

FIG. 1 schematically shows a processor 10 of the prior art processing such a WFI signals. In such a system it is desirable for the clock (clkin) that clocks the pipeline to be turned off in response to the WFI. The processor 10 has a "standby" output 43 indicative of when the processor enters this low power mode. This clock clkin therefore needs to be separate from the clock (freeclk) that clocks logic 26. Logic 26 comprising a gate 25 that turns the clkin off and on, interrupt processing logic 20 which processes the WFI and receives the interrupt that will restart the processor and synchronisers 30. Clock clk, clocking the pipeline 15 has a clock tree 17 comprising buffers within its feed line operable to insert delays in the line in various places in order to synchronise the clock across the processor. As these buffers consume power it is desirable for the clock passing through them to be turned off in response to the WFI signal. Therefore in order to save power the freeclk does not have buffers and is not synchronised with the clkin. As the freeclk is not synchronised with the clkin synchronisers 30 are needed on the line transmitting the WFI signal to the interrupt processing logic 20 in order to synchronise this signal with respect to the freeclk.

Figure 2:
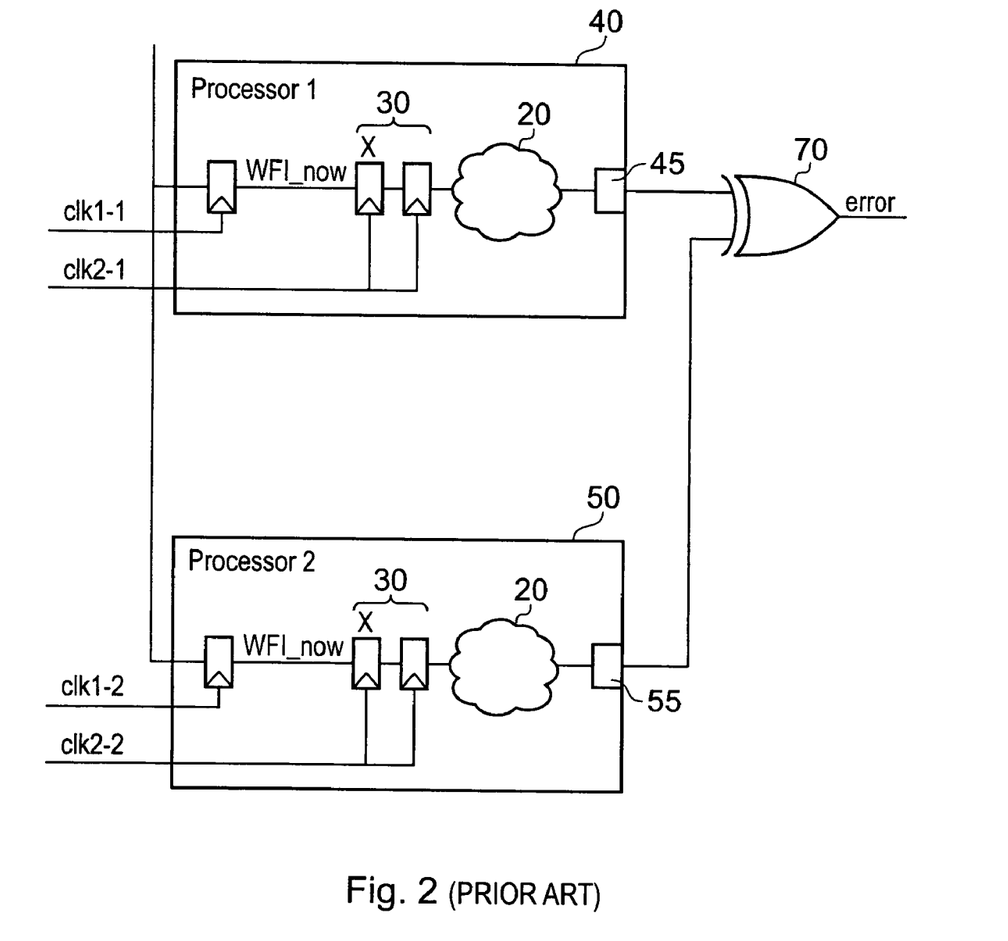
FIG. 2 schematically shows two processors arranged in parallel redundant form according to the prior art.

In safety critical applications it may be desirable to run two (or more) processors in parallel, any difference in their outputs being indicative of an error. In such systems it is important that no false errors are generated. In systems using asynchronous logic such as the one described above, it is possible for a false error to be generated due to very slight timing differences in the clocks of the two processors. FIG. 2 shows two processors 40, 50 similar to those illustrated in FIG. 1 operating in parallel. Outputs 45, 55 from the two processors are compared by comparator 70 (which in this example is an exclusive OR gate) and any difference in the two signals generates an error signal.

In the case of a WFI instruction being used in processors 40 and 50 of FIG. 2, a problem can occur due to synchronisation and a false error may result.

Figure 3:
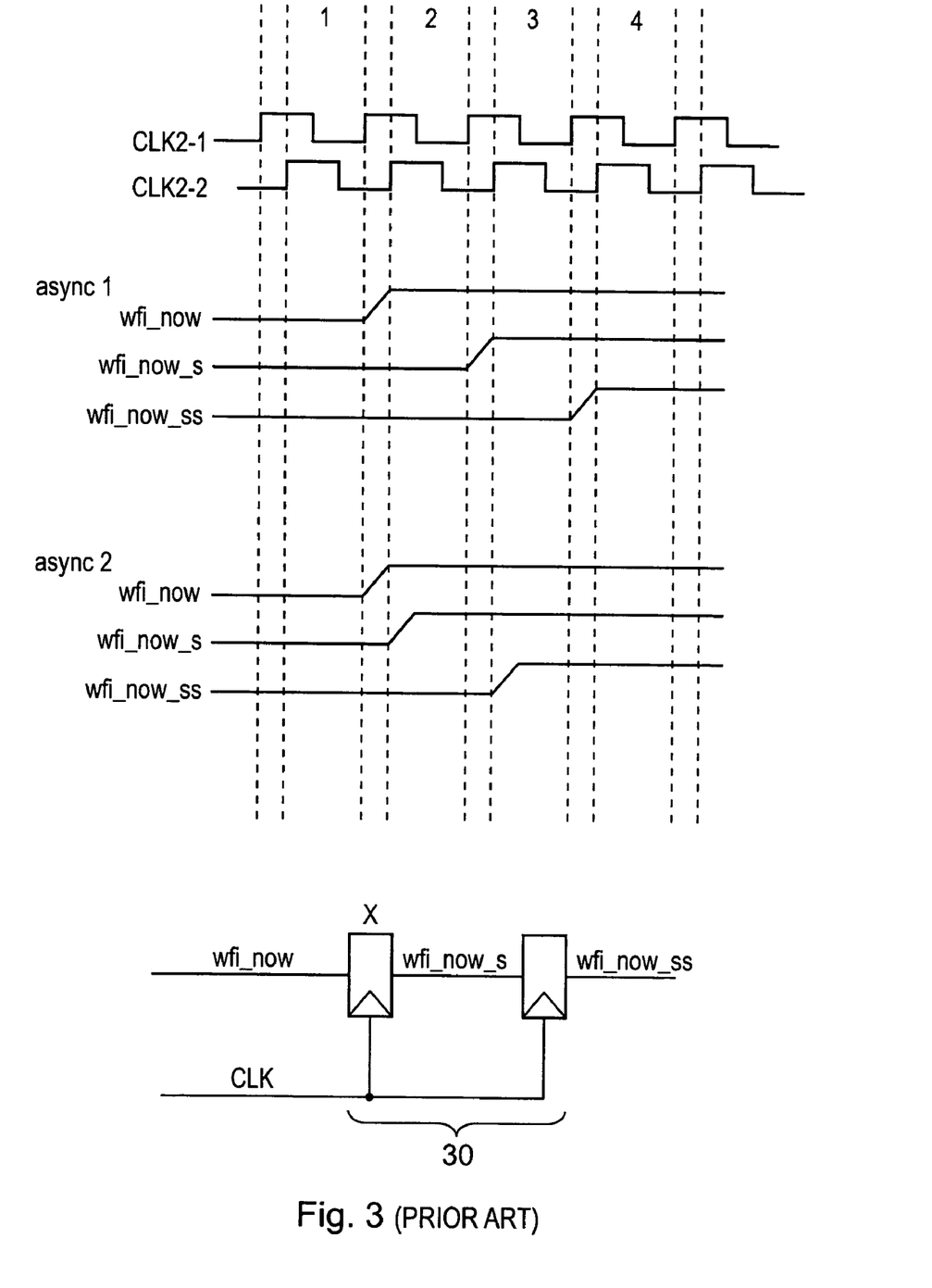
FIG. 3 schematically shows a timing diagram for the propagation of the wait for interrupt signal through synchronisers 30 of the two processors of FIG. 2.

FIG. 3 shows a timing diagram illustrating how a slight difference in clock signals clk2-1 and clk2-2 can result in a false error signal when the wait for interrupt signal is received at or near a clock edge. In this figure the clock signals for processor1 40 and for processor2 50 are shown as clk2-1 and clk2-2 respectively. As can be seen, clk2-2 has a slight delay over clk2-1. It should be noted that this is magnified in this figure and would in reality be much less.

In the example shown in FIG. 3, the WFI-now signal is asserted just before the rising edge of clk2-2 but just after the rising edge of clk2-1. Thus, the first synchronisation register of synchroniser 30 does not transition to the new WFI value in clock cycle 2 for async1 but it does for async2. There is therefore a whole clock cycle difference between the two signals WFI-now-s output from the first register X of synchroniser 30 of FIG. 2.

Although the example given relates to WFI instructions, it should be noted that the problem of false errors being generated in processors operating in parallel is one that may arise for any such processors having asynchronous logic.

SUMMARY OF THE INVENTION

A first aspect of the present invention provides a data processing apparatus comprising a plurality of data processors, each of said plurality of data processors comprising: first logic operable in a first clock domain and further logic operable in a second clock domain, said first and second clock domains being asynchronous with each other; a synchroniser operable to synchronise a signal processed by said first logic to produce a signal synchronised to said second clock domain; a synchronised signal output operable to export from said data processor said synchronised signal processed by said first logic; and a signal input operable to import a signal to said data processor, said data processor being operable to route said imported signal to said further logic; wherein said plurality of data processors are arranged to operate in parallel with each other and said data processing apparatus further comprises: combining logic arranged to receive said exported synchronised signals from each of said plurality of data processors and to combine said exported synchronised signals to produce a resultant signal, said resultant signal being routed to each of said signal inputs of said plurality of data processors.

A data processing apparatus having a plurality of data processors each with a signal output operable to export a synchronised signal and a signal input operable to import a signal provides a flexible solution to the problems that can arise from asynchronous logic within a data processor. In particular, by simply providing input and output ports for the synchronised signal, the synchronised signal can be exported from the processor, processed externally and then imported, the imported signal being sent to the further logic in place of the signal output from the synchroniser. This is particularly applicable to situations where data processors are operating in parallel, for example in safety critical applications. In such systems, the synchronisation of signals travelling from one clock domain to another asynchronous clock domain can generate false errors. This problem is addressed by combining the exported synchronised signals to produce a single resultant signal which is then re-imported to each of the data processors. The combination of the exported signals to produce a single resultant signal ensures that the signals that are input to the further logic in each of the data processors are synchronised with each other (being the same signal).

In some embodiments said synchroniser is operable to synchronise a signal output from said first logic to produce said signal synchronised to said second clock domain.

In some embodiments said data processing apparatus comprises two portions and said synchronised signal output is arranged to output said signal processed by said first logic after said signal has been processed by one of said two portions of said further logic and said data processor is operable to route said imported signal to second portion of said further logic.

It may be that the synchronisation of the signals is only important for a portion of the further logic, in such a case, the signals can be exported after they have been processed by some of the further logic, and then reimported for processing by the portion of the logic where synchronisation is vital.

In some embodiments said combining logic comprises an AND gate operable to AND each of said synchronised signals with each other.

Use of an AND gate as combining logic is a simple yet effective way of combining the signals and ensuring that when both synchronised signals have reached the same value, this value is input to both processors.

In other embodiments, said combining logic comprises an OR gate operable to OR each of said synchronised signals with each other.

In some situations it may be desirable to send the synchronised signal to the further logic once one of the signals has been asserted rather than waiting for all of the signals from the plurality of data processors to be asserted. In these circumstances an OR gate can be used for the combining logic rather than an AND gate.

It should be noted that different combining logic can be used for different circumstances. For example, if the signal to be synchronised is one that switches from high to low rather than from low to high, then suitable gates could be selected to send the synchronised signal back to the processors either in response to the signal from each of the plurality of data processors going low, or in response to just one going low.

Although the data processors can comprise any number of data processors in some embodiments there are two substantially the same data processors arranged in parallel to perform the same task.

In some embodiments, each of said plurality of data processors are substantially the same and are arranged in parallel to perform the same tasks in parallel, each of said data processors being operable to output at least one output signal, said data processing apparatus further comprising comparison logic operable to compare corresponding output signals from said plurality of data processors and to output an error signal in response to detection of a difference in said output signals.

Embodiments of this invention are particularly applicable to safety critical installations where a plurality of data processors are arranged in parallel to perform the same task. Comparison logic is used to compare outputs of these data processors, any difference in outputs indicating that one of the processors is operating differently to the other(s) and thus, a fault may have occurred in one of the processors. Detection of such an error generally triggers a warning of some sort such as a warning light in an automobile. The error can then be checked and where necessary corrected. Embodiments of the present invention are particularly appropriate for use in such systems, as it is obviously important that only errors generated by a failure in one of the data processors are detected and not errors generated by differences in output due to synchronisation problems.

In some embodiments, said synchronised signal comprises a wait for interrupt request signal operable to control at least a portion of a data processor to enter a lower power state, said plurality of data processors being operable in response to receipt of said resultant signal to simultaneously respond to said wait for interrupt request signal.

Embodiments of the present invention are particularly applicable to wait for interrupt instructions as these can be prone to synchronisation problems and can thereby produce false errors in safety critical processors.

In some embodiments, said combining logic is operable to compare said exported synchronised signals and in response to said exported synchronised signals being equal to each other or different by one cycle or less, said combining logic is operable to output a resultant signal to each of said data processors and in response to said exported signals being different by more than one cycle, said combining logic is operable to output an error signal.

It should be noted that in some embodiments, a difference in the synchronised signals output from the plurality of processors may not be due to synchronisation problems, but could be due to one of the processors not operating correctly. In order to ensure such an error is detected, the combining logic can be used to verify whether the synchronised signals are the same as each other or different to each other by one cycle. If they are not then it would seem that this is not a synchronisation problem, but rather one of the data processors is not operating correctly and thus an error signal should be output.

A further aspect of the present invention provides a method of processing data within a data processing apparatus comprising performing in parallel within a plurality of data processors the steps of: processing a signal within first logic in a first clock domain; synchronising said signal processed by said first logic to produce a signal synchronised to a second clock domain, said second clock domain being asynchronous with said first clock domain; exporting said synchronised signal via a synchronised signal output from each of said plurality of data processors; and combining said synchronised signals output from said plurality of data processors to produce a resultant signal; and importing said resultant signal via a signal input to each of said plurality of data processors; and routing said imported signal within each of said plurality of data processors to be processed by further logic, said further logic being operable in said second clock domain.

A yet further aspect of the present invention provides a means for processing data within a plurality of processing means, each of said plurality of processing means comprising: first logic means operable in a first clock domain and further logic means operable in a second clock domain, said first and second clock domains being asynchronous with each other; a synchronising means for synchronising a signal processed by said first logic means with said second clock domain; a synchronised signal output means for exporting said synchronised signal from said processing means; and a signal input means for importing a signal to said processing means, said processing means being operable to route said imported signal to said further logic means; wherein said plurality of processing means are arranged to operate in parallel with each other and said means for processing data further comprises: combining logic means arranged to receive said exported synchronised signals from each of said plurality of processing means and to combine said exported synchronised signals to produce a resultant signal, said resultant signal being routed to each of said signal inputs of said plurality processing means.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 4A:
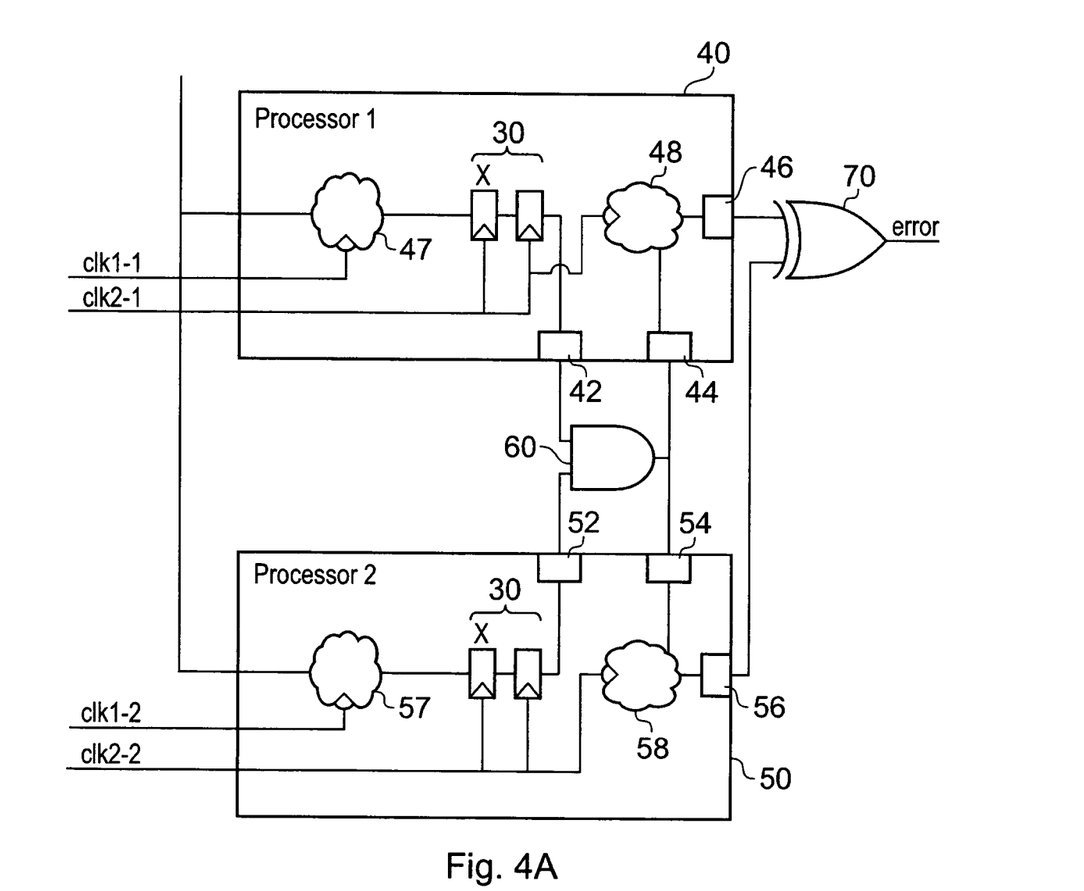
FIG. 4A schematically shows a data processing apparatus having two data processors arranged in parallel according to an embodiment of the invention.
Figure 4B:
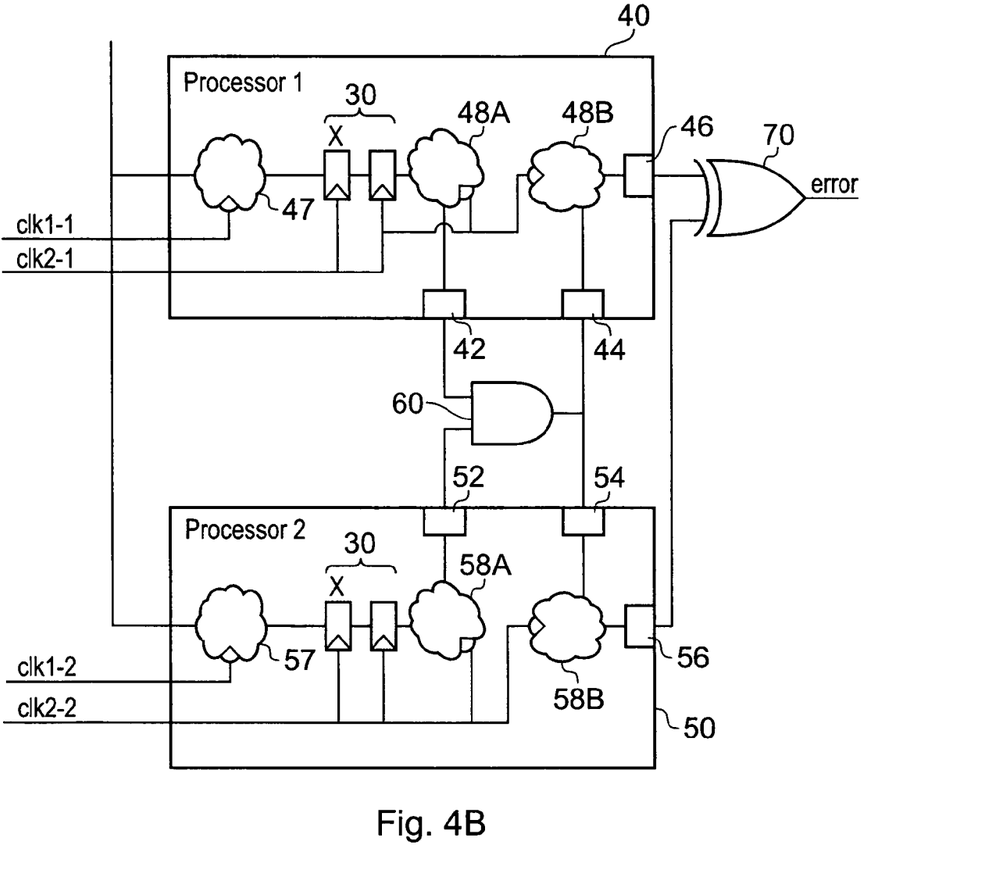
FIG. 4B schematically shows a data processing apparatus having two data processors arranged in parallel, with the second logic blocks having two portions according to an embodiment of the invention.

FIG. 4 shows a data processing apparatus according to an embodiment of the invention. This data processing apparatus is similar to the data processing apparatus of FIG. 2 having two processors operating side by side. As mentioned before, in safety critical applications, such as for example in automative applications, it may be necessary to use two (or more) processors side by side. These processors share their inputs and therefore should always generate identical outputs. Should an error occur in one processor the outputs will differ and a simple block of comparators 70 can generate an error signal. If within each of the two processors there is two or more blocks of logic that are asynchronous with each other, a difference in output signals can be generated due to synchronisation problems. Such a difference may be identified by the comparators 70 as an error in one of the processors. In order to address the potential problem of false error generation this embodiment differs from the prior art embodiment of FIG. 2 in that it has a synchronised signal output 42, 52 and combining logic 60 to combine the exported synchronised signals to produce a resultant signal. This resultant signal is then fed to signal inputs 44, 54 of the two data processors 40, 50 prior to being processed by logic 48, 58. In this way the synchronised signals are combined and a single signal is input to both processors thereby ensuring that the two processors react to the synchronised signals together.

With reference to FIG. 4A a signal is processed in respective first logic blocks 47, 57 of the two processors, each of these blocks operating in the first clock domain clk1. The signals are then to be passed to further logic 48, 58 which operates in a further clock domain clk2. Before entering the further clock domain the signals need to be synchronised to the new clock domain and thus, they are passed through synchroniser 30. As discussed with reference to FIG. 2, the register X of synchroniser 30 of one processor may produce a signal that is not identical to the signal produced by register X of synchroniser 30 of the other processor due to slight differences in the clocks between the two processors. In order to ensure that identical signals enter the further logic 48, 58 each of the processors 40, 50 have signal outputs 42, 52 respectively operable to export the synchronised signal output from the synchroniser 30. These synchronised signals are combined in combining logic 60 and the resultant signal is input to respective processors 40, 50 via respective signal inputs 44 and 54. Thus, this resultant signal is used in the place of the synchronised signals exiting the respective synchronisers 30 and this ensures that the two signals entering the further logic blocks 48, 58 are identical. Thus, false errors such as those possible with the processor of FIG. 2 are avoided with this arrangement.

In the embodiments shown, the combining logic 60 is an AND gate. Thus, when both signals are high it outputs a high signal and this is imported back into the processors. In some embodiments, it may be desirable to forward the synchronised signal when one of the signals from the two (or more) processors has gone high. In such a case an OR gate could be used as the combining logic 60. Clearly other logic arrangements are possible, for example, it may be an active low signal that is propagated rather than an active high one in which case a different arrangement of gates or logic would be used.

In the embodiment shown, the signal is exported after the synchroniser 30 and prior to entry into the second logic block 48, 58. However in some embodiments, the signal may enter a portion of the second logic block and then be exported from the processors to be combined by combining logic 60 prior to be reimported. FIG. 4B shows a circuit diagram similar to FIG. 4A, wherein the second logic is divided into first and second portions 48A, 58A and 48B, 58B respectively and the signal is exported and reimported between the two blocks. Thus, the signal is processed by first portions of the second logic block 48A, 58A and then it is exported to be combined by combining logic 60, the resultant signal is then be reimported to the processors 40, 50 to be processed by the second portion of 48B, 58B of the second logic blocks 48, 58.

Figure 5:
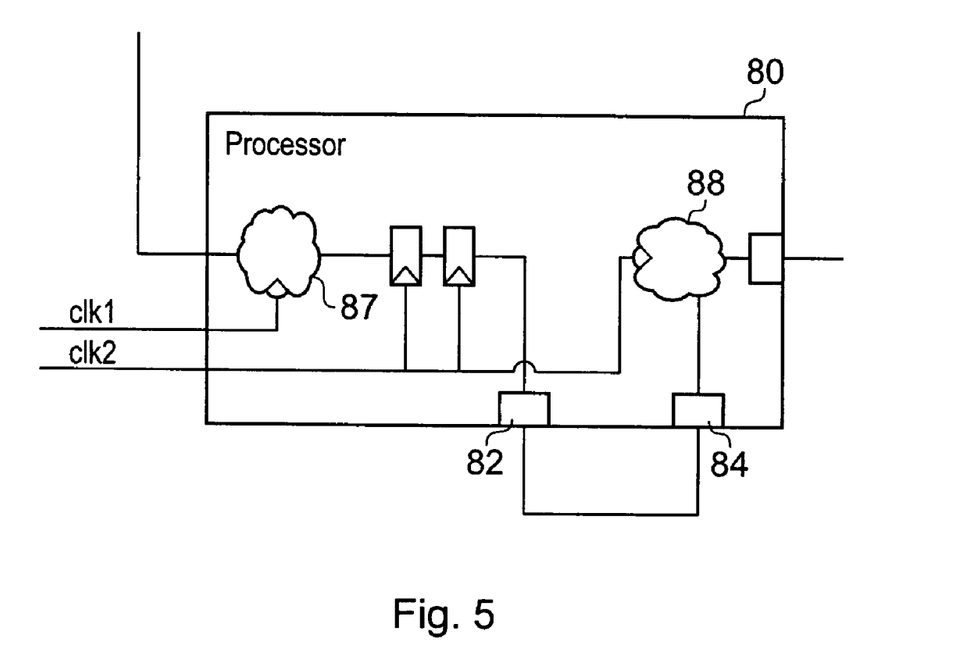
FIG. 5 schematically shows a data processor.

FIG. 5 shows a data processor according to an embodiment of the present technique. In this embodiment processor 80 comprises first logic 87 clocked by clk1, further logic 88 clocked by clk 2 and synchroniser 30 operable to synchronise the signal output from first logic 87 prior to inputting it to further logic 88. The processor comprises a synchronised signal output 82 and a signal input 84. In this embodiment the synchronised signal output 82 is connected to signal input 84 and thus, the data processor acts in the same way as it would have if the signals had not been exported. This embodiment allows the data processor 80 to operate as a standard data processor, for example, in situations where the data processor is not operating in parallel redundant form and synchronisation problems generating false errors do not arise. Although embodiments of the present invention have been devised to provide a solution to synchronisation problems in processors operating in parallel redundant form, it is not practical to design processors simply for this application. A data processor according to an embodiment of the present technique can be used in a range of applications with the exported signal simply being hard wired to the signal input in circumstances where synchronisation problems are not an issue. Thus, embodiments of the present technique are extremely flexible in their use.

Figure 6:
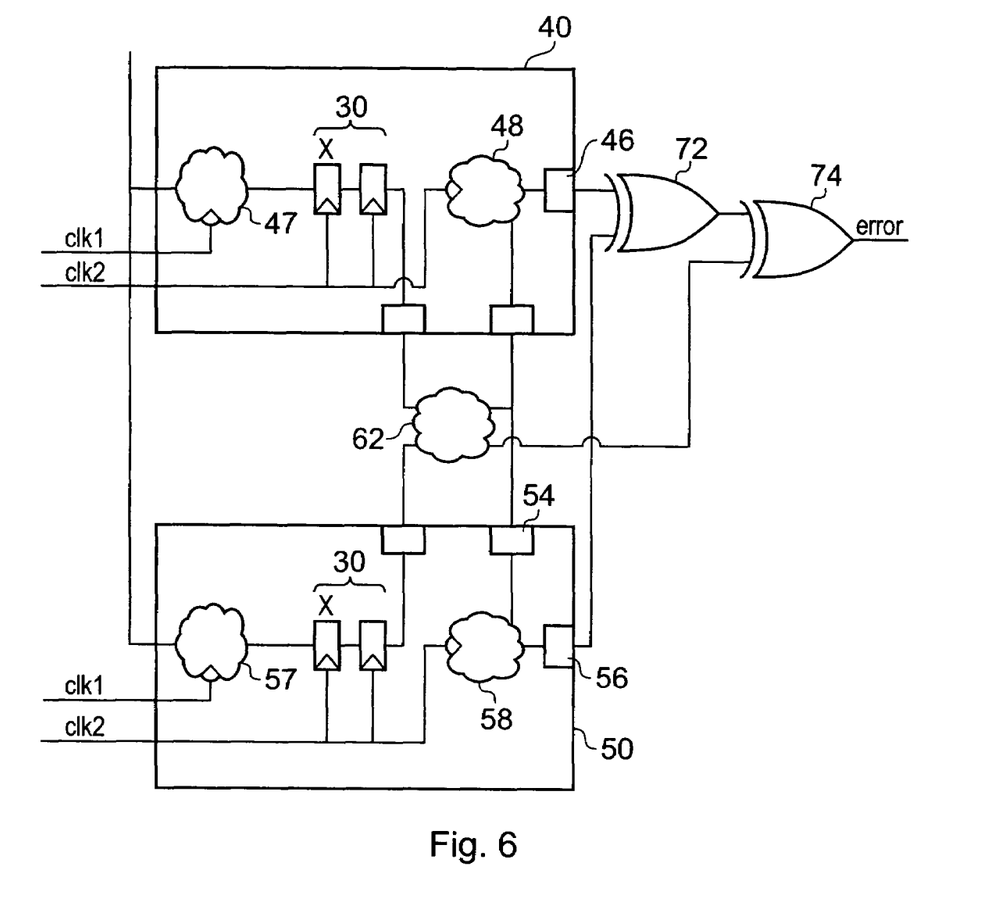
FIG. 6 schematically shows a data processing apparatus according to an embodiment of the present invention.

FIG. 6 shows a further embodiment of the data processing apparatus. In this embodiment combining logic 62 is operable to compare the exported synchronised signals and if they are equal or are different by one clock cycle or less it acts to combine them and to output a single resultant signal to both data processors. However, it has the additional function of detecting if the signals are different to each other by more than one clock cycle. If this is the case it implies that the difference between the signals does not arise due to synchronisation problems and that in fact one processor is operating differently to the other, i.e. one may have an error. In such a case a signal indicating this is generated and forwarded to error logic gates 72 and 74. These error logic gates combine the signals output from the two processors via outputs 46 and 56 and the signal generated by logic 62 and if any of these produce signals indicating a difference in operation of the two processors an error signal is generated.

Figure 7:
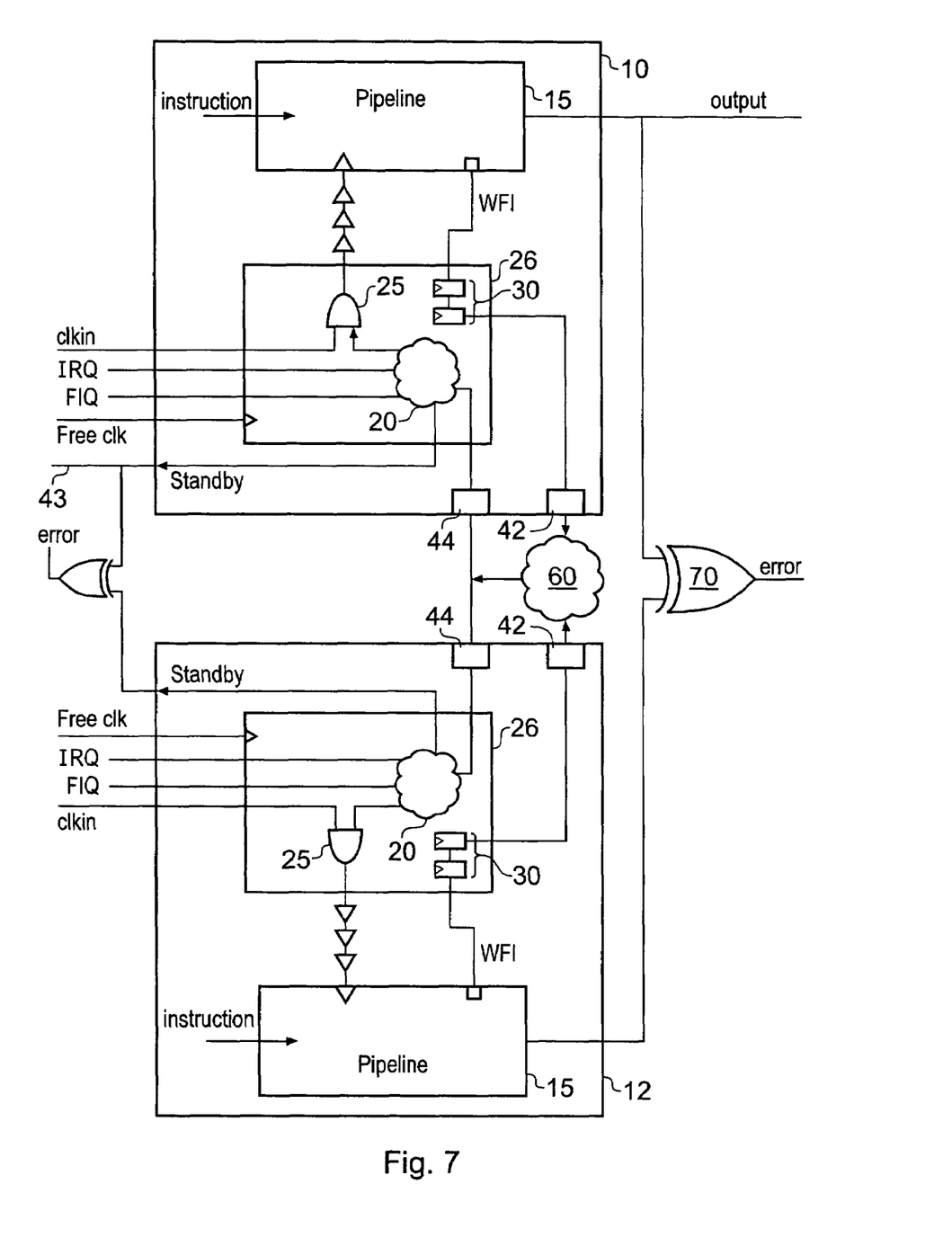
FIG. 7 shows a data processing apparatus having two processors similar to those in FIG. 1 arranged in parallel redundant form according to an embodiment of the present invention.

FIG. 7 shows two data processors 10 and 12 similar to the data processor of FIG. 1 operating in redundant side by side mode. This embodiment shows how the problem that may arise in such an arrangement with WFI instructions is dealt with. In this embodiment a WFI instruction from pipeline 15, the pipeline being clocked by a first clock CLKin is to be sent to logic block 26 that is clocked by freeclk. Logic block 26 contains interrupt processing logic 20, CLK gate 25 and synchroniser 30. Prior to being input to interrupt processing logic 20 the WFI signal needs to be synchronised by synchroniser 30. Following this, the signal is exported via synchronised signal output 42. It is then combined by combining logic 60 with a synchronised signal output from identical (or nearly identical) processor 12 to produce a resultant signal which is input to both processors at signal inputs 44. This signal is sent to interrupt processing logic 20 where it controls the processor to gate clock clk off and power down much of the processor. The freeclk keeps operating and in response to an interrupt IRQ or FIQ received by interrupt processing logic 20 CLKin is started again and the processor resumes normal operation. The export and combination of the synchronised signals avoids potential differences occurring in the signals output from the two processors 10 and 12 caused by the two synchronised signals not being identical (see FIG. 3).

There is also a standby signal 43, that is output as an indication that low power mode has been entered. This signal can also be compared between processors to indicate if there is an error in one of the processors, i.e. if one of the two processors enters low power mode while the other processor is still normal operational mode.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising a plurality of data processors, each of said plurality of data processors comprising:
    first logic operable in a first clock domain and further logic operable in a second clock domain, said first and second clock domains being asynchronous with each other;
    a synchroniser operable to synchronise a signal processed by said first logic to produce a signal synchronised to said second clock domain;
    a synchronised signal output operable to export from said data processor said synchronised signal processed by said first logic; and
    a signal input operable to import a signal to said data processor, said data processor being operable to route said imported signal to said further logic; wherein
    said plurality of data processors are arranged to operate in parallel with each other and said data processing apparatus further comprises:
    combining logic arranged to receive said exported synchronised signals from each of said plurality of data processors and to combine said exported synchronised signals to produce a resultant signal, said resultant signal being routed to each of said signal inputs of said plurality of data processors.

2. A data processing apparatus according to claim 1, wherein said synchroniser is operable to synchronise a signal output from said first logic to produce said signal synchronised to said second clock domain.

3. A data processing apparatus according to claim 1, wherein said further logic comprises two portions and said synchronised signal output is arranged to output said signal processed by said first logic after said signal has been processed by one of said two portions of said further logic and said data processor is operable to route said imported signal to second portion of said further logic.

4. A data processing apparatus according to claim 1, wherein said combining logic comprises an AND gate operable to AND each of said synchronised signals with each other.

5. A data processing apparatus according to claim 1, wherein said combining logic comprises an OR gate operable to OR each of said synchronised signals with each other.

6. A data processing apparatus according to claim 1, comprising two substantially the same data processor arranged in parallel to perform the same task.

7. A data processing apparatus according to claim 1, wherein each of said plurality of data processors are substantially the same and are arranged in parallel to perform the same tasks in parallel, each of said data processors being operable to output at least one output signal, said data processing apparatus further comprising:
    comparison logic operable to compare corresponding output signals from said plurality of data processors and to output an error signal in response to detection of a difference in said output signals.

8. A data processing apparatus according to claim 1, wherein said synchronised signal comprises a wait for interrupt request signal operable to control at least a portion of a data processor to enter a lower power state, said plurality of data processors being operable in response to receipt of said resultant signal to simultaneously respond to said wait for interrupt request signal.

9. A data processing apparatus according to claim 1, said combining logic being operable to compare said exported synchronised signals: and
    in response to said exported synchronised signals being equal to each other or different by one cycle or less, said combining logic is operable to output a resultant signal to each of said data processors; and
    in response to said exported signals being different by more than one cycle, said combining logic is operable to output an error signal.

10. A method of processing data within a data processing apparatus comprising performing in parallel within a plurality of data processors the steps of:
    processing a signal within first logic in a first clock domain;
    synchronising said signal processed by said first logic to produce a signal synchronised to a second clock domain, said second clock domain being asynchronous with said first clock domain;
    exporting said synchronised signal via a synchronised signal output from each of said plurality of data processors; and
        combining said synchronised signals output from said plurality of data processors to produce a resultant signal; and
    importing said resultant signal via a signal input to each of said plurality of data processors; and
    routing said imported signal within each of said plurality of data processors to be processed by further logic, said further logic being operable in said second clock domain.

11. A means for processing data within a plurality of processing means, each of said plurality of processing means comprising:
    first logic means operable in a first clock domain and further logic means operable in a second clock domain, said first and second clock domains being asynchronous with each other;
    a synchronising means for synchronising a signal processed by said first logic means with said second clock domain;

a synchronised signal output means for exporting said synchronised signal from said processing means; and a signal input means for importing a signal to said processing means, said processing means being operable to route said imported signal to said further logic means; wherein said plurality of processing means are arranged to operate in parallel with each other and said means for processing data further comprises:

combining logic means arranged to receive said exported synchronised signals from each of said plurality of processing means and to combine said exported synchronised signals to produce a resultant signal, said resultant signal being routed to each of said signal inputs of said plurality processing means.

* * * * *